(12) United States Patent
Tong

(10) Patent No.: US 11,219,820 B2
(45) Date of Patent: Jan. 11, 2022

(54) CONTROL METHOD FOR VIRTUAL CONTROLLED OBJECT, APPARATUS, STORAGE MEDIUM, AND ELECTRONIC APPARATUS

(71) Applicant: Tencent Technology (Shenzhen) Company Limited, Shenzhen (CN)

(72) Inventor: Yan Tong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 4 days.

(21) Appl. No.: 16/859,337

(22) Filed: Apr. 27, 2020

(65) Prior Publication Data

US 2020/0254333 A1 Aug. 13, 2020

Related U.S. Application Data

(63) Continuation of application No. PCT/CN2018/124201, filed on Dec. 27, 2018.

(30) Foreign Application Priority Data

Jan. 5, 2018 (CN) .......................... 201810011619.0

(51) Int. Cl.
*A63F 13/2145* (2014.01)
*A63F 13/5375* (2014.01)
*A63F 13/56* (2014.01)

(52) U.S. Cl.
CPC ...... *A63F 13/2145* (2014.09); *A63F 13/5375* (2014.09); *A63F 13/56* (2014.09)

(58) Field of Classification Search
CPC ... A63F 13/2145; A63F 13/533; A63F 13/426
See application file for complete search history.

(56) References Cited

U.S. PATENT DOCUMENTS

| 4,734,685 A | * | 3/1988 | Watanabe | ............. G06F 3/0317 345/157 |
| 6,323,846 B1 | * | 11/2001 | Westerman | .......... G06K 9/6272 345/173 |
| 2012/0019453 A1 | * | 1/2012 | Westerman | ......... G06F 3/04883 345/173 |

FOREIGN PATENT DOCUMENTS

| CN | 103069379 A | 4/2013 |
| CN | 104166471 A | 11/2014 |

(Continued)

OTHER PUBLICATIONS

Tencent Technology, ISR, PCT/CN2018/124201, Feb. 27, 2019, 2 pgs.

(Continued)

*Primary Examiner* — James S. McClellan
(74) *Attorney, Agent, or Firm* — Morgan, Lewis & Bockius LLP

(57) ABSTRACT

Embodiments of the present disclosure disclose a method for controlling a virtual controlled object performed at a terminal. The method includes: detecting a first target operating instruction produced by a first touch operation while a client is running a game on the terminal; in response to the first target operating instruction, controlling a virtual controlled object in the game to move toward a target direction; and while controlling the virtual controlled object to move toward the target direction, controlling, by the terminal, the virtual controlled object to continue to movement toward the target direction after detecting that the first touch operation is lost. The embodiments of the present disclosure resolve a technical problem of low efficiency of controlling a virtual controlled object in the related art.

17 Claims, 6 Drawing Sheets

(56) References Cited

FOREIGN PATENT DOCUMENTS

| CN | 105630350 A | 6/2016 |
|---|---|---|
| CN | 105749551 A | 7/2016 |
| CN | 108310770 A | 7/2018 |
| JP | 2015-173806 A | 10/2015 |

OTHER PUBLICATIONS

Tencent Technology, WO, PCT/CN2018/124201, Feb. 27, 2019, 5 pgs.
Tencent Technology, IPRP, PCT/CN2018/124201, Jul. 7, 2020, 6 pgs.

* cited by examiner

CONTROL METHOD FOR VIRTUAL CONTROLLED OBJECT, APPARATUS, STORAGE MEDIUM, AND ELECTRONIC APPARATUS

RELATED APPLICATION

This application is a continuation application of PCT Application No. PCT/CN2018/124201, entitled "METHOD AND DEVICE FOR CONTROLLING VIRTUAL CONTROL OBJECT AND STORAGE MEDIUM AND ELECTRONIC DEVICE" filed on Dec. 27, 2018, which claims priority to Chinese Patent Application No. 201810011619.0, entitled "CONTROL METHOD FOR VIRTUAL CONTROLLED OBJECT, APPARATUS, STORAGE MEDIUM, AND ELECTRONIC APPARATUS" filed with the Chinese National Intellectual Property Administration on Jan. 5, 2018, all of which are incorporated by reference in their entirety.

FIELD OF THE TECHNOLOGY

Embodiments of the present disclosure relate to the field of computers, and specifically, to a control method for a virtual controlled object, an apparatus, a storage medium, and an electronic apparatus.

BACKGROUND OF THE DISCLOSURE

Currently, in a process of performing a game operation, in a case that operation loss occurs carelessly, the control over a virtual controlled object may be stopped, and consequently, the virtual controlled object does not perform any operation anymore.

Due to the loss of an operation, in a game, the virtual controlled object may be controlled sometimes, and the control over the virtual controlled object may be stopped sometimes. As a result, in a game, the virtual controlled object cannot be controlled continuously. In addition, the virtual controlled object may perform operations sometimes and may not perform operations sometimes, and the virtual controlled object cannot perform operations continuously in a game. This goes against expected operations performed by controlling the virtual controlled object, and there is a problem of low efficiency of controlling a virtual controlled object.

For the foregoing problem of low efficiency of controlling the virtual controlled object, no effective solution has been proposed currently.

SUMMARY

Embodiments of the present disclosure provide a control method for a virtual controlled object, an apparatus, a storage medium, and an electronic apparatus, so as to resolve at least a technical problem of low efficiency of controlling a virtual controlled object in the related art.

According to an aspect of the embodiments of the present disclosure, a method for controlling a virtual controlled object is performed at a terminal. The method includes: detecting, by the terminal, a first target operating instruction produced by a first touch operation while a client is running a game on the terminal; in response to the first target operating instruction, controlling, by the terminal, a virtual controlled object in the game to move toward a target direction; and while controlling the virtual controlled object to move toward the target direction, controlling, by the terminal, the virtual controlled object to continue movement toward the target direction after detecting that the first touch operation is lost.

According to another aspect of the embodiments of the present disclosure, a terminal is provided for controlling a virtual controlled object, the terminal comprising one or more processors and memory storing a plurality of program units. The plurality of program units, when executed by the one or more processors, perform the aforementioned method for controlling a virtual controlled object as described above.

According to another aspect of the embodiments of the present disclosure, a non-transitory computer readable storage medium stores a plurality of computer programs that, when executed by a terminal having one or more processors, cause the terminal to perform the aforementioned method for controlling a virtual controlled object as described above.

In the embodiments of the present disclosure, in a process that a client is running a game, a terminal controls, in response to a first target operating instruction produced by a first touch operation, a virtual controlled object in the game to move toward a target direction, the terminal being provided with the client; and in a process of controlling the virtual controlled object to move toward the target direction, the terminal controls the virtual controlled object to continue to move toward the target direction in a case of detecting that the first touch operation is lost. In a process of controlling the virtual controlled object to move toward the target direction, the virtual controlled object is controlled to continue to move toward the target direction in a case that the touch operation is lost. That is, in a case that the touch operation is lost, a pre judgment is performed on an operation to be performed by the virtual controlled object, and the virtual controlled object is controlled to continue to move toward the same direction, to achieve an expectation of controlling the virtual controlled object, and prevent the control over the virtual controlled object from being stopped in a case that the touch operation is lost. In this way, a technical effect of improving the efficiency of controlling the virtual controlled object is implemented, to further resolve the technical problem of low efficiency of controlling the virtual controlled object in the related art.

BRIEF DESCRIPTION OF THE DRAWINGS

Accompanying drawings described herein are used to provide further understanding about the embodiments of the present disclosure, and constitute one portion of the present disclosure; and schematic embodiments of the present disclosure and their description are used to explain the present disclosure, and do not constitute an inappropriate limit on the present disclosure. In the accompanying drawings.

DESCRIPTION OF EMBODIMENTS

To make a person skilled in the art better understand solutions of the present disclosure, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It is to be understood that data used in this way is exchangeable in a proper case, so that the embodiments of the present disclosure described herein can be implemented in another order except those shown or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

According to an aspect of the embodiments of the present disclosure, an embodiment of a control method for a virtual controlled object is provided.

Figure 1:
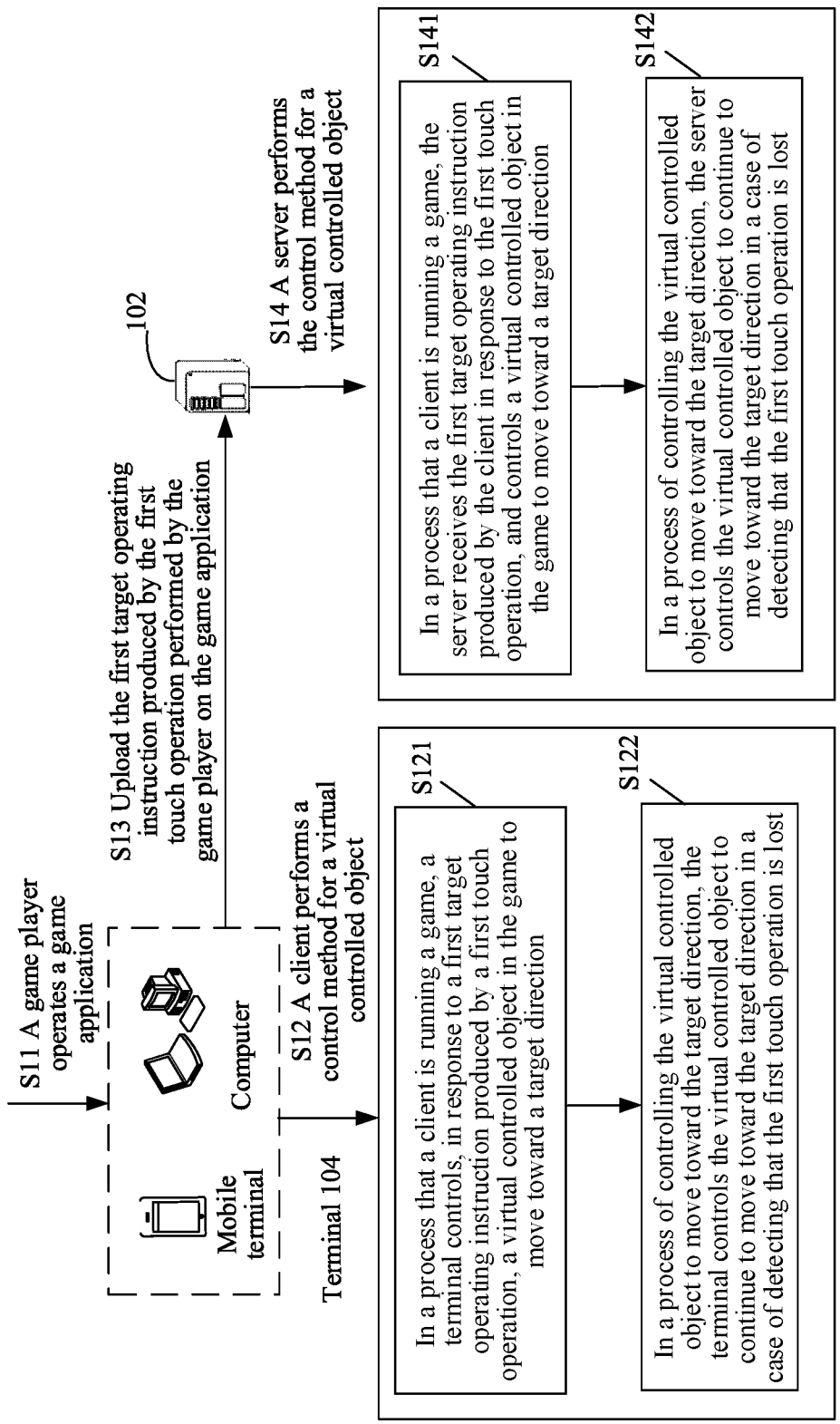
FIG. 1 is a schematic diagram of a hardware environment of a control method for a virtual controlled object according to an embodiment of the present disclosure.

Optionally, in this embodiment, the control method for a virtual controlled object may be applied to a hardware environment formed by a server 102 and a terminal 104 shown in FIG. 1. FIG. 1 is a schematic diagram of a hardware environment of a control method for a virtual controlled object according to an embodiment of the present disclosure.

As shown in FIG. 1, the server 102 is connected to the terminal 104 through a network. The network includes, but is not limited to, a wide area network, a metropolitan area network, and a local area network. The terminal 104 is not limited to a personal computer (PC), a mobile phone, a tablet computer, and the like. The control method for a virtual controlled object in the embodiments of the present disclosure may be performed by the server 102, or be performed by the terminal 104, or be performed by the server 102 and the terminal 104 together. The terminal 104 may perform the control method for a virtual controlled object in the embodiments of the present disclosure by using a client installed on the terminal 104.

The hardware environment of the control method for a virtual controlled object in this embodiment relates to the following steps:

Step S11: A game player operates a game application.

The game player performs a first touch operation on the game application, to produce a first target operating instruction.

Step S12: A client performs a control method for a virtual controlled object.

Specifically, that a client performs a control method for a virtual controlled object includes the following steps:

Step S121: In a process that a client is running a game, a terminal controls, in response to a first target operating instruction produced by a first touch operation, a virtual controlled object in the game to move toward a target direction, where the terminal is provided with the client.

Step S122: In a process of controlling the virtual controlled object to move toward the target direction, the terminal controls the virtual controlled object to continue to move toward the target direction in a case of detecting that the first touch operation is lost.

As an optional implementation, the hardware environment of the control method for a virtual controlled object relates to the following steps:

Step S13: Upload the first target operating instruction produced by the first touch operation performed by the game player on the game application.

Step S14: A server performs the control method for a virtual controlled object.

Specifically, that a server performs the control method for a virtual controlled object includes the following steps:

Step S141: In a process that a client is running a game, the server receives the first target operating instruction produced by the client in response to the first touch operation, and controls a virtual controlled object in the game to move toward a target direction, where the terminal is provided with the client.

Step S142: In a process of controlling the virtual controlled object to move toward the target direction, the server controls the virtual controlled object to continue to move toward the target direction in a case of detecting that the first touch operation is lost.

The foregoing step S11 to step S12, or step S11, step S13, and step S14 include a complete implementation process of the technical solution of this application. The technical solution of this application mainly relates to step S12 or step S14, and the technical solution of step S12 is described in detail below with reference to a specific embodiment.

Figure 2:
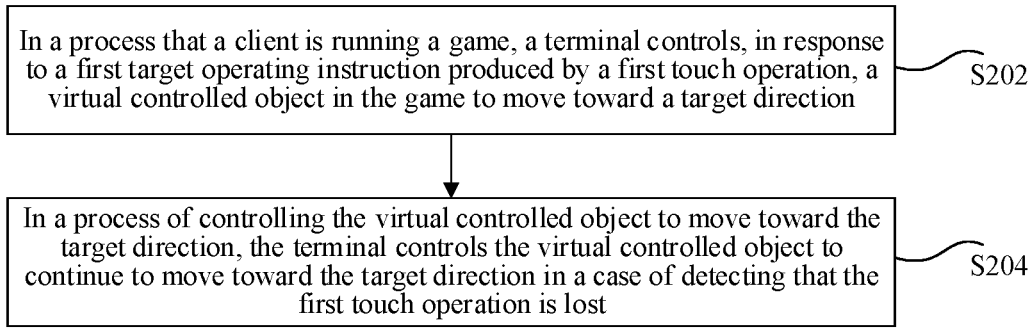
FIG. 2 is a flowchart of a control method for a virtual controlled object according to an embodiment of the present disclosure.

FIG. 2 is a flowchart of a control method for a virtual controlled object according to an embodiment of the present disclosure. As shown in FIG. 2, step S121 and step S202 correspond to each other, and step S122 and step S204 correspond to each other. The method may include the following steps:

Step S202: In a process that a client is running a game, a terminal controls, in response to a first target operating instruction produced by a first touch operation, a virtual controlled object in the game to move toward a target direction.

In the technical solution provided in step S202 of this application, the terminal is provided with the client, and a game is run on the client. That is, a game of a game application is run on the client, and the game application may be a battle-type game application, such as a multiplayer online battle arena game (MOBA), which may be installed on the terminal. The game application may be controlled by using a virtual joystick, and the virtual joystick is a virtual button, disposed on the terminal, of the game application. In a case that the game player touches and holds the button of the virtual joystick to perform a drag operation, an operation of a real joystick may be simulated.

In a process of running a game of the game application, the being in response to the first target operating instruction produced by the first touch operation may be in response to a first target operating instruction produced by a first touch operation performed by the game player on the virtual joystick, for example, in response to the first target operating instruction produced by the drag operation performed by the game player on the button of the virtual joystick, to control the virtual controlled object in the game to move toward a target direction. The first target operating instruction may be used for controlling the virtual controlled object in the game to move toward a target direction, and the virtual controlled object may be a game role controller by the game player in a game scene of a game application.

In this embodiment, during controlling the virtual controlled object in a game to move toward a target direction in response to the first target operating instruction produced by the first touch operation, the virtual controlled object may be continuously controlled to move toward the target direction in the game scene. Optionally, the target direction of the movement of the virtual controlled object in the game scene is controlled by an action direction of the first target operating instruction on a display interface of the client. For example, the first target operating instruction is a movement operation instruction, the game player touches and holds the virtual joystick disposed on the game application to make the virtual joystick keep a state of being dragged downward all the time, and then the movement operation instruction may persist. In this case, the game role is controlled to move downward all the time in the game scene in response to the movement operation instruction all the time.

The terminal may be a smartphone (for example, an Android phone, an iOS phone, and the like), a tablet computer, a PAD, or another terminal facilitating operations of a user, and is not limited herein.

Step S204: In a process of controlling the virtual controlled object to move toward the target direction, the terminal controls the virtual controlled object to continue to move toward the target direction in a case of detecting that the first touch operation is lost.

In the technical solution provided in step S204 of this application, in the process of controlling the virtual controlled object to move toward the target direction, whether the first touch operation is lost is detected. In a case that the first target operating instruction is not obtained, for example, a region on which the game player operates the game application exceeds a region on which operations are allowed, operation loss may occur. The first target operating instruction obtained in the region on which operations are allowed may be responded to, and the region on which operations are allowed may be an operable region on the display interface of the game application, or may be an operable region on a screen of the terminal.

In a case of detecting that the first touch operation is lost, the virtual controlled object is controlled to continue to move toward the target direction, and the continuing to move toward the target direction is a pre judged operation performed on the virtual controlled object in a case that the first target operating instruction is not responded to. That is, in a case that the first touch operation is not lost, the virtual controlled object may still continue to move toward the target direction.

For example, the controlling the virtual controlled object to move toward the target direction is to move along a direction B, and then in a case of detecting that the first touch operation is lost, the virtual controlled object may be controlled to continue to move along the direction B, For example, the virtual controlled object is controlled to swim in a river in the game scene along the direction B. In a case of detecting that the first touch operation is lost, the virtual controlled object is controlled to continue to swim in the river in the game scene along the direction B rather than being controlled to stop swimming.

In this embodiment, in a case that the first touch operation is lost, a pre-judgment is performed on an operation to be performed by the virtual controlled object, and the virtual controlled object is controlled to continue to move toward the target direction, to prevent the control over the virtual controlled object from being stopped in a case that the touch operation is lost, to further improve the efficiency of controlling the virtual controlled object.

According to the foregoing step S202 to step S204, in a process that a client is running a game, a terminal controls, in response to a first target operating instruction produced by a first touch operation, a virtual controlled object in the game to move toward a target direction, the terminal being provided with the client; and in a process of controlling the virtual controlled object to move toward the target direction, the terminal controls the virtual controlled object to continue to move toward the target direction in a case of detecting that the first touch operation is lost. In a process of controlling the virtual controlled object to move toward the target direction, the virtual controlled object is controlled to continue to move toward the target direction in a case that the touch operation is lost. That is, in a case that the touch operation is lost, a pre judgment is performed on an operation to be performed by the virtual controlled object, and the virtual controlled object is controlled to continue to move toward the same direction, to achieve an expectation of controlling the virtual controlled object, and prevent the control over the virtual controlled object from being stopped in a case that the touch operation is lost. In this way, a technical effect of improving the efficiency of controlling the virtual controlled object is implemented, to further resolve the technical problem of low efficiency of controlling the virtual controlled object in the related art.

As an optional implementation, in step S204, in the process of controlling the virtual controlled object to move toward the target direction, the method further includes: detecting whether the first touch operation is lost according to at least one of the following operations: determining that the first touch operation is lost in a case that the first touch operation exceeds a touchscreen of the terminal, the terminal being provided with the client; and determining that the first touch operation is lost in a case that the first touch operation reaches a preset region on the touchscreen of the terminal.

In this embodiment, the client is installed on the terminal, the terminal includes a touchscreen, and the touchscreen may be a region in which the touch operation of the game player may be responded to. In the process of controlling the virtual controlled object to move toward the target direction, in a case that the first touch operation exceeds the touchscreen of the terminal, that is, in a case that an action region of the first touch operation exceeds a region in which the terminal may respond to the touch operation of the game player, the terminal may determine that the touch operation is lost, and does not respond to the first touch operation in this case.

Optionally, it may be set that the preset region of the touchscreen of the terminal is a region in which the game player is prohibited from performing any touch operation. For example, the preset region is used for implementing an operating function of the terminal. The game player is prohibited from performing any touch operation, to avoid a case in which the game player performs an incorrect operation on the terminal to affect the operating function of the terminal, such as a message notification bar on the terminal used for displaying prompt information. In a case that the first touch operation reaches the preset region of the touchscreen of the terminal, the terminal may determine that the first touch operation is lost. That is, in a case that the first touch operation exceeds the touchscreen of the terminal, the terminal may not respond to the first touch operation.

As an optional implementation, the preset region of the touchscreen includes an edge of the touchscreen.

In this embodiment, the preset region of the touchscreen of the terminal may be an edge of the touchscreen, that is, an operating dead-zone of the touchscreen of the terminal. In a case that the first touch operation reaches the edge of the touchscreen of the terminal, the terminal may determine that the first touch operation is lost, and does not respond to the first touch operation.

As an optional implementation, in step S204, the controlling, by the terminal, the virtual controlled object to continue to move toward the target direction includes: controlling, by the terminal, the virtual controlled object to continue to move toward the target direction within target duration.

In this embodiment, the duration in which the virtual controlled object continues to move toward the target direction may be limited. The terminal controls the virtual controlled object to continue to move toward the target direction within the target duration, where the target duration is a time length allowing the virtual controlled object to continue to move toward the target direction in a case of detecting that the first touch operation is lost. For example, the target duration is 10 seconds, and the virtual controlled object is allowed to continue to move toward the target direction for 10 seconds in a case of detecting that the first touch operation is lost.

In the process of controlling the virtual controlled object to move toward the target direction, in a case of detecting that the first touch operation is lost, the terminal may not respond to the first target operating instruction due to the incorrect operation of the game player. For example, the game player touches and holds the virtual joystick by using a left thumb to keep a state of being dragged downward of the virtual joystick all the time to produce the first target operating instruction, to control the virtual controlled object to move downward in the game scene. Therefore, under such an operation, the game player may easily move the left thumb to an edge part of a screen of a mobile terminal to enter an operating dead-zone. That is, the operation exceeds the operable region, and the operation may be lost because the first target operating instruction is not responded to. In this case, the virtual controlled object is controlled to continue to move toward the target direction within the target duration. After the game player realizes that the operation is incorrect, the game player may perform a correct operation at once, to further control the virtual controlled object, to prevent the control over the virtual controlled object from being stopped in a case that the touch operation is lost, so that the game player may participate in the game as soon as possible, to further improve the efficiency of game application control.

As an optional implementation, the controlling, by the terminal, the virtual controlled object to continue to move toward the target direction within target duration includes: obtaining, by the terminal, duration in which the virtual controlled object continues to move toward the target direction; controlling, by the terminal, the virtual controlled object to continue to move toward the target direction in a case that the duration does not exceed the target duration; and controlling, by the terminal, the virtual controlled object to stop moving toward the target direction in a case that the duration exceeds the target duration.

In this embodiment, in the process of controlling the virtual controlled object to move toward the target direction, in a case of detecting that the first touch operation is lost, the terminal starts timing at the same time of controlling the virtual controlled object to continue to move toward the target direction, and the terminal obtains duration in which the virtual controlled object continues to move toward the target direction. After obtaining the duration in which the virtual controlled object continues to move toward the target direction, the terminal determines whether the duration exceeds the target duration. In a case that the duration does not exceed the target duration, the virtual controlled object is controlled to continue to move toward the target direction; and in a case that the duration exceeds the target duration, the virtual controlled object is controlled to stop moving toward the target direction. That is, the virtual controlled object is controlled to stop performing a pre-judged operation, to prevent the virtual controlled object from being automatically controlled all the time in a case that the game player performs an incorrect operation, which reduces the competitive fairness of the game application.

As an optional implementation, in the process that the terminal controls the virtual controlled object to continue to move toward the target direction within target duration, the method further includes: controlling, by the terminal, the virtual controlled object to stop moving toward the target direction in a case that the terminal obtains, within the target duration, a second target operating instruction produced by a second touch operation, the second target operating instruction being used for controlling a moving direction of the virtual controlled object.

In this embodiment, the terminal controls the virtual controlled object to continue to move toward the target direction with the target duration. In a case of determining that the duration does not exceed the target duration and the second target operating instruction produced by the second touch operation is obtained, the terminal controls the virtual controlled object to stop moving toward the target direction. That is, once the second target operating instruction is obtained, the terminal controls the virtual controlled object to stop performing a pre judged operation. The second target operating instruction may be used for controlling the moving direction of the virtual controlled object. The virtual controlled object may be controlled to move toward another direction, or the virtual controlled object may be controlled to continue to move along the target direction.

Optionally, in a case that the virtual controlled object is controlled to continue to move along the target direction through the second target operating instruction, the virtual controlled object is first controlled to stop moving toward the target direction, and then the virtual controlled object is controlled to continue to move along the target direction in response to the second target operating instruction again at an interval of a target time. The target time may be quite small, so that the game player cannot perceive a pause of the movement of the virtual controlled object.

Optionally, in this embodiment, in a case of determining that the duration does not exceed the target duration and the second target operating instruction is not obtained either, the virtual controlled object is controlled to continue to move toward the target direction.

As an optional implementation, before the terminal controls the virtual controlled object to continue to move toward the target direction with the target duration, the method further includes: receiving, by the terminal, a first setting instruction; and in response to the first setting instruction, setting, by the terminal, the target duration.

In this embodiment, the target duration may be flexibly set according to a requirement of the game player. The target duration may be set before a game starts, or may be set in a process of running a game. The terminal receives the first setting instruction, the first setting instruction is used for setting maximum duration allowing the virtual controlled object to execute the second target operating instruction, and for example, the maximum duration is 5 seconds. After the terminal receives the first setting instruction, the terminal sets, in response to the first setting instruction, the maximum duration allowing the virtual controlled object to execute the second target operating instruction to the target duration, and for example, the target duration is sXet to 5 seconds. A manner for setting the target duration may be manual input, or may be adjusted by using a slider bar, or may be selected by a drop-down menu, and is not limited herein.

As an optional implementation, in step S204, in a case that the terminal detects that the first touch operation is lost, the method further includes: displaying, by the terminal, first prompt information on a client, the first prompt information being used for prompting that the first touch operation is lost.

In this embodiment, in a case that the terminal detects that the first touch operation is lost, the first prompt information may be displayed on the client in a case that the virtual controlled object is controlled to continue to move toward the target direction, and the first prompt information is used for prompting the game player that the first touch operation is lost, to make the game player adjust later operations as soon as possible. Optionally, the first prompt information may be text information, voice information, icon information, and the like, and is not limited herein. As a result, the game player may realize that an incorrect operation is likely to be done in a range exceeding the operable region, so that the game player may correct the operation manner of the game application, to further improve the efficiency of game application control.

As an optional implementation, after the terminal displays the first prompt information on the client, the method further includes: in a case that the virtual controlled object stops moving toward the target direction, canceling, by the terminal, the display of the first prompt information on the client.

In this embodiment, after the terminal displays the first prompt information on the client, in a case that the duration in which the virtual controlled object continues to move toward the target direction exceeds the target duration, or, within the target duration, the second target operating instruction produced by the second touch operation is obtained, the terminal controls the virtual controlled object to stop moving toward the target direction, and the first prompt information disappears in this case. That is, the display of the first prompt information is ended, and the game player is not prompted anymore.

As an optional implementation, in a case that the terminal cancels the display of the first prompt information on the client, the method further includes: displaying, by the terminal, second prompt information on the client, the second prompt information being used for prompting to cancel the display of the first prompt information.

In this embodiment, in a case that the virtual controlled object is controlled to stop moving toward target direction, the terminal may display the second prompt information on the client, and content indicated by the second prompt information may be opposite to the content indicated by the first prompt information, and may be used for prompting to cancel the display of the first prompt information. The second prompt information may be text information, voice information, icon information, and the like, and is not limited herein. As a result, the game player may know a current state of the performance of the virtual controlled object.

As an optional implementation, in step S204, before the terminal detects that the first touch operation is lost, the method further includes: receiving, by the terminal, a second setting instruction; and in response to the second setting instruction, initiating, by the terminal, a movement pre judgment function, the movement pre judgment function allowing the terminal to control the virtual controlled object to continue to move toward the target direction in a case that the terminal detects that the first touch operation is lost.

In this embodiment, the terminal may set, in a case of detecting that the first touch operation is lost, the initiation or shutdown of the movement pre judgment function controlling the virtual controlled object to continue to move toward the target direction.

Before detecting that the first touch operation is lost, the terminal receives the second setting instruction. The second setting instruction is used for allowing the terminal to control the virtual controlled object to continue to move toward the target direction in a case of detecting that the first touch operation is lost. That is, the second setting instruction is used for initiating the movement pre judgment function. After the terminal receives the second setting instruction, the terminal initiates the movement pre judgment function in response to the second setting instruction, to allow the terminal to control the virtual controlled object to continue to move toward the target direction in a case of detecting that the first touch operation is lost.

Optionally, a third setting instruction is received. The third setting instruction is used for prohibiting the terminal from controlling the virtual controlled object to continue to move toward the target direction in a case of detecting that the first touch operation is lost, that is, shut down the movement pre judgment function. After receiving the third setting instruction, the terminal is prohibited from controlling the virtual controlled object to continue to move toward the target direction in response to the third setting instruction. In this way, in a case that the first target operating instruction is not responded to, controlling the virtual controlled object to perform operations is stopped, and for example, the virtual controlled object may stop moving, to further improve the flexibility of the setting of the movement pre judgment function.

As an optional implementation, the first touch operation includes: a slide operation, and the target direction includes one of the following directions: an upper left direction, a left direction, a lower left direction, a lower direction, and a lower right direction.

In this embodiment, the first touch operation includes a slide operation, and a slide operation instruction may be produced in response to the slide operation performed by the game player on the display interface of the game application, to control the virtual controlled object in a game to move along the target direction.

The target direction of this embodiment may be an upper left direction, a left direction, a lower left direction, a lower direction, and a lower right direction in which the left thumb may easily operate. In a case that the terminal controls the virtual controlled object in a game to move toward a target direction in response to the first target operating instruction produced by the first touch operation, a slide operation instruction produced by the slide operation may be responded to. For example, if the action direction of the slide operation instruction on the display interface of the game application is downward, the virtual controlled object is controlled to move along the downward direction in a virtual scene.

As an optional implementation, in step S202, the responding, by the terminal, to the first target operating instruction produced by the first touch operation includes: responding to the first target operating instruction in a case that the terminal obtains the first target operating instruction in a target region, where the display interface of the game application includes the target region.

In this embodiment, the target region is an operable region on the game application, and the display interface of the game application is used for displaying a game screen of the game application. For example, the display interface of the game application is a screen of a mobile terminal, and the screen includes the target region. Optionally, each region in the game interface may be a target region, the first target operating instruction obtained by the terminal in the target region may be responded to, and a case of loss of operations does not occur.

As an optional implementation, in step S204, before the virtual controlled object is controlled to continue to move toward the target direction, the method further includes: determining, by the terminal, that the first target operating instruction is not responded to in a case that the first target operating instruction is obtained in a region exceeding the target region.

In this embodiment, operation instructions out of the target region cannot be responded to. For example, a region exceeding an edge of the screen of the mobile terminal is an operating dead-zone in which the operation instructions cannot be responded to. In a case that the terminal obtains the first target operating instruction in a region exceeding the target region, the first target operating instruction cannot be responded to, and it is determined that the first target operating instruction is not responded to. That is, a case that the operation is lost is determined to occur.

In this embodiment, a next operation to be performed by the virtual controlled object may be pre judged and automatically performed according to the continuity of the operations of the game player by using a program algorithm in a case that the operation of the game player is lost, and the game player is informed that the operation is lost. As a result, the efficiency of the control over the game application is improved, so that the game player may take a corresponding measure in time, to reduce the loss in a case that the operation is lost, and to further improve the efficiency of controlling a virtual controlled object. For the game player, poor game experience brought by the loss of the operations of the game player is reduced.

The following describes the technical solutions of the present disclosure with reference to exemplary embodiments.

Figure 3:
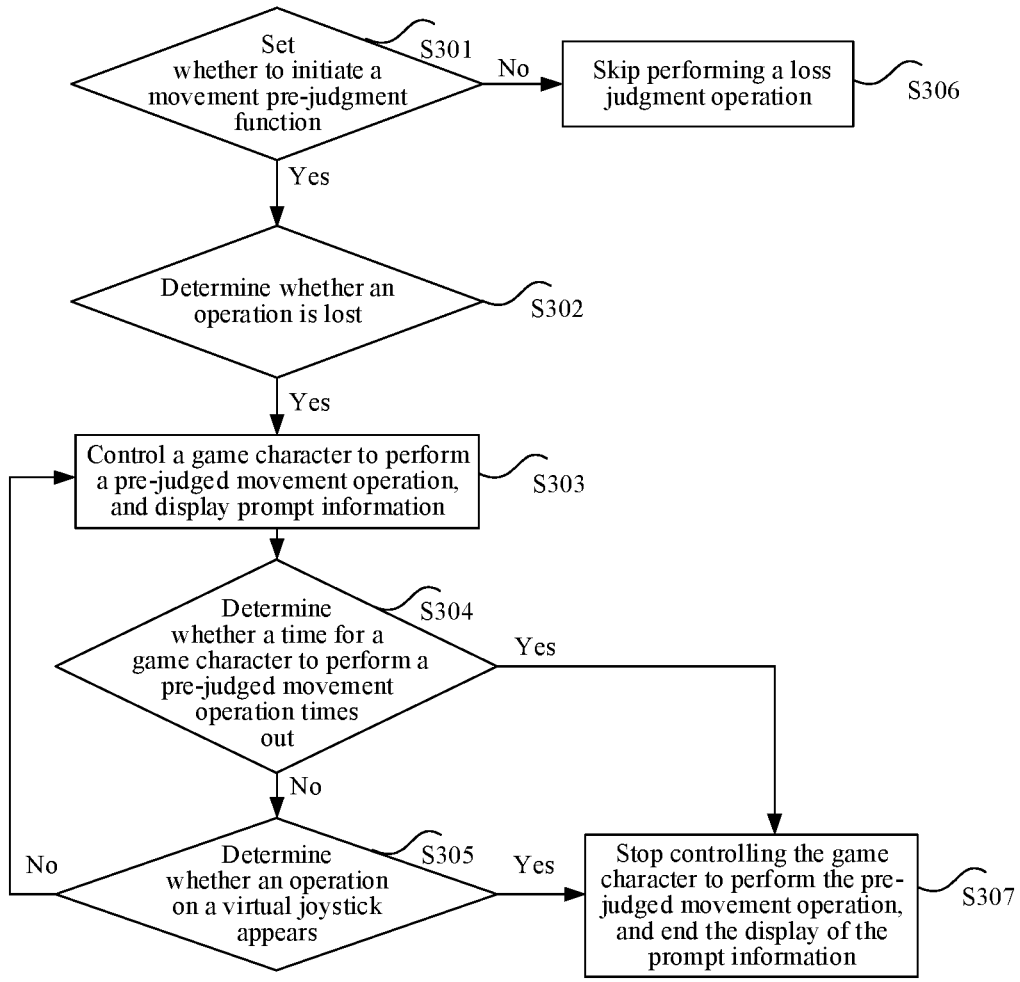
FIG. 3 is a flowchart of another control method for a virtual controlled object according to an embodiment of the present disclosure.

FIG. 3 is a flowchart of another control method for a virtual controlled object according to an embodiment of the present disclosure. As shown in FIG. 3, the method includes the following steps:

Step S301: Set whether to initiate a movement pre judgment function.

The game player may initiate or shut down the "movement pre-judgment" function by setting the setting panel of the terminal. In a case that the movement pre-judgment function is set to initiate, step S302 is performed, and in a case that the movement pre judgment function is not set to initiate, step S306 is performed.

Step S302: Determine whether an operation is lost.

After setting whether to initiate the movement pre judgment function, whether the operation is lost is determined. The game player may move along any one direction B of the five directions including the upper left direction, the left direction, the lower left direction, the lower direction, and the lower right direction, and in a case that the finger slides beyond an edge of the screen and the operation disappears, it is determined that the operation is lost. In a case that the operation is lost, step S303 is performed.

Step S303: Control a game character to perform a pre-judged movement operation, and display prompt information.

After determining whether the operation is lost, in a case that the operation is lost, the game character is controlled to perform a pre-judged movement operation and the prompt information is displayed. Timing may be started in a case that the operation is determined to be lost, the game character controlled by the game player may continue to move along the direction B, and prompt information C is displayed, to prompt that the game character has entered a pre-judged movement.

Step S304: Determine whether a time for a game character to perform a pre-judged movement operation times out.

After the game character is controlled to perform a pre-judged movement operation and prompt information is displayed, whether a time for the game character to perform the pre-judged movement operation times out is determined. In a case that it is determined that the time for the game character to perform the pre judged movement operation does not time out, step S305 is performed, and in a case that it is determined that the time for the game character to perform the pre-judged movement operation times out, step S307 is performed.

Step S305: Determine whether an operation on a virtual joystick appears.

After whether the time for the game character to perform the pre-judged movement operation times out is determined, in a case that it is determined that the time for the game character to perform the pre judged movement operation does not time out, whether an operation on a virtual joystick appears is determined. In a case that it is determined that an operation on the virtual joystick appears, step S307 is performed, and in a case that it is determined that an operation on the virtual joystick does not appear, step S303 is performed.

Step S306: Skip performing a loss judgment operation.

In a case that the movement pre judgment function is not set to initiate, performing the loss judgment operation is skipped.

Step S307: Stop controlling the game character to perform the pre-judged movement operation, and end the display of the prompt information.

In a case that it is determined that the time for the game character to perform the pre-judged movement operation times out, or in a case that it is determined that an operation on the virtual joystick appears, controlling the game character to perform the pre-judged movement operation is stopped, and the display of the prompt information is ended. That is, in a case that the time for the game player to operate the virtual joystick or perform the pre judged movement operation exceeds a time A, the pre judged movement ends, the game character stops moving and prompt information C disappears.

For an application environment in this embodiment of the present disclosure, refer to, but not limited to, the application environment in the foregoing embodiment. Details are not described again in this embodiment. This embodiment of the present disclosure provides an optional specific application for performing the foregoing control method for a virtual controlled object.

Figure 4:
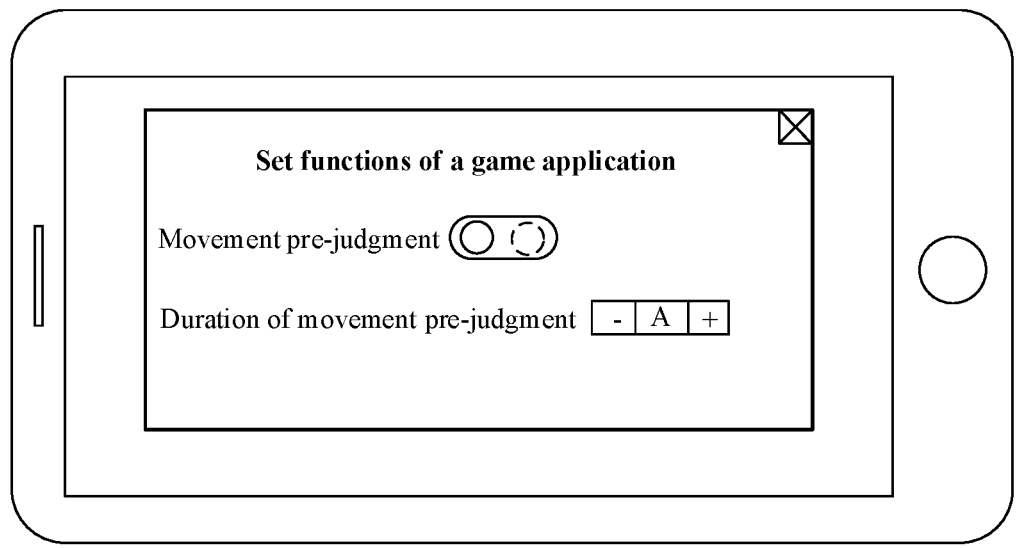
FIG. 4 is a schematic diagram of a function setting interface of a game application according to an embodiment of the present disclosure.

FIG. 4 is a schematic diagram of a function setting interface of a game application according to an embodiment of the present disclosure. As shown in FIG. 4, the function setting interface is used for initiating or shutting down the movement pre judgment function and setting duration A for a movement pre-judgment. The movement pre judgment function is not initiated by default, and a setting button of the movement pre judgment function displays a small solid line circle on the left. Optionally, the setting button is in a gray color for instructing to shut down the movement pre judgment function. In a case that the movement pre judgment function needs to be initiated, the user may tap the setting button of the movement pre judgment function, and the solid line circle is displayed at the location of the dotted line circle on the right of the setting button in response to the tap operation of the user. Optionally, the setting button becomes highlighted, for example, becomes green highlighted, to instruct to initiate the movement pre judgment function.

In this embodiment, in a case that the duration of pre judged movement is set, a setting button for the duration of the pre-judged movement is only available in a case that the movement pre judgment function needs to be initiated. The duration for the pre judged movement may be A by default, and the game player may increase ("+") or decrease ("−") the duration of pre judged movement according to requirements of the game player.

A manner for setting the duration A of pre-judged movement may be further manual input, or may be adjusted by using a slider bar, or may be selected by a drop-down menu, and is not limited herein.

After the movement pre judgment function is set and the duration of pre-judged movement is set, the function setting interface may be closed. For example, the function setting interface may be closed by operating "X" on the upper right corner of the function setting interface.

Figure 5:
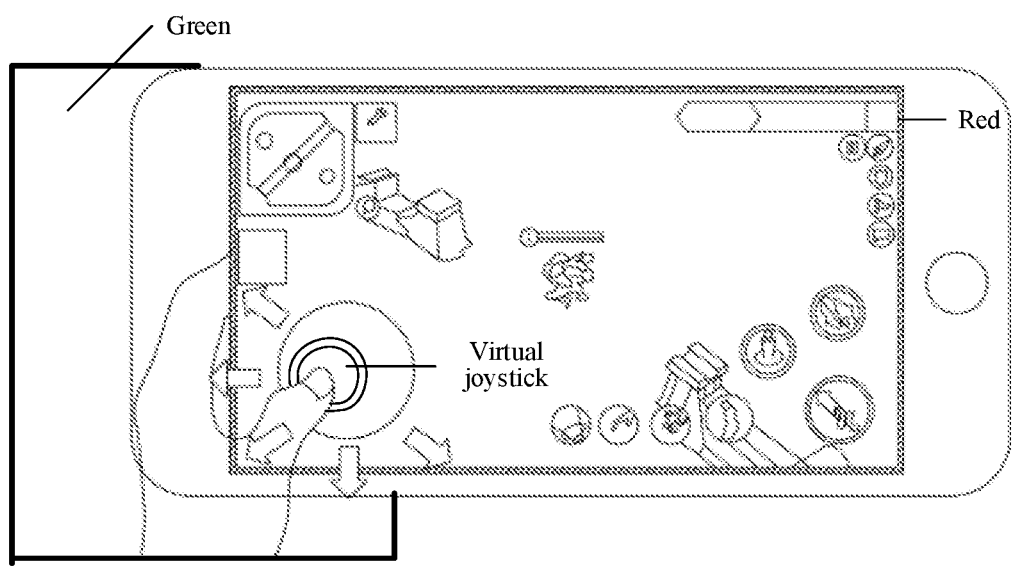
FIG. 5 is a schematic diagram of a control interface of a game application according to an embodiment of the present disclosure.

FIG. 5 is a schematic diagram of a control interface of a game application according to an embodiment of the present disclosure. As shown in FIG. 5, a response region of a screen of a mobile terminal is inside a red indication box, and operations cannot be responded to in other regions out of the red indication box. For example, operations in a region inside a green indication box cannot be responded to.

The virtual joystick in the game application is placed at the lower left part of the screen for operation, and the game player moves the game role by controlling the virtual joystick in the game application. The movement operations are generally continuous, for example, for controlling the game role to walk downward all the time in the game scene, the game player needs to touches and holds the virtual joystick by using the left thumb and keeps a state of dragging downward all the time. However, under this operation, the game player may easily move the left thumb out of the region inside the red indication box and enter the region in the green indication box, and the region in the green indication box does not respond to the operation. Consequently, the operation is lost. In an original solution, the movement of the game role stops, which goes against an expected effect of the game player.

In this embodiment, in a case that the operation is lost, a movement pre-judgment is performed on the game role, to keep the consistency of the movement and achieve an effect of an expected operation performed by the game player on the game role, and the operation is prevented from being lost.

In this embodiment, the game player may initiate or shut down the movement pre judgment function by setting the setting panel, and the game player may further set the duration A of pre-judged movement in a case that the operation is lost.

The game player may move along one direction B of the five directions including the upper left direction, the left direction, the lower left direction, the lower direction, and the lower right direction shown in FIG. 5, and in a case that the left thumb of the game player slides beyond an edge of the screen and the operation disappears, it is determined that the operation is lost.

Figure 6:
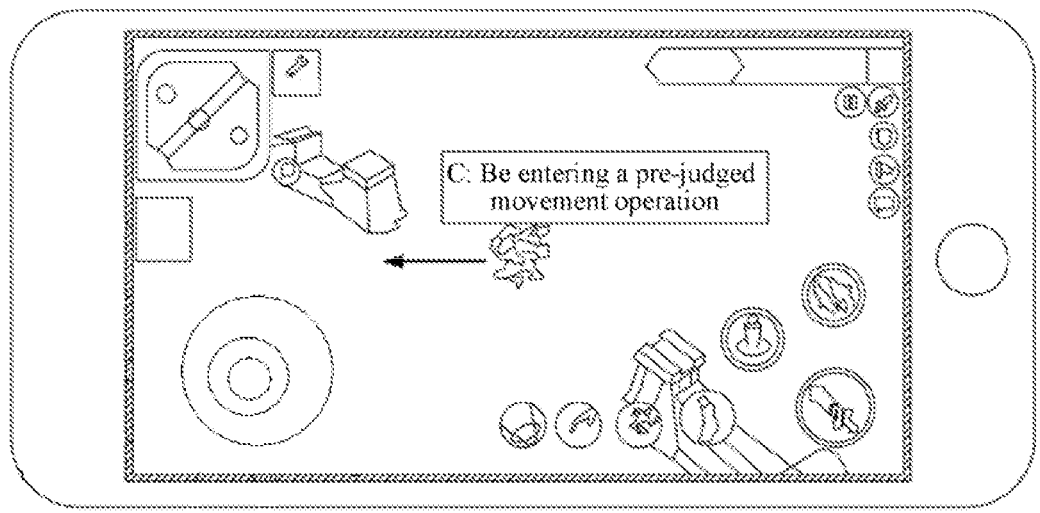
FIG. 6 is a schematic diagram of prompting that a pre-judged movement operation starts according to an embodiment of the present disclosure.

FIG. 6 is a schematic diagram of prompting that a pre-judged movement operation starts according to an embodiment of the present disclosure. As shown in FIG. 6, timing is started in a case that the operation is determined to be lost, the game role controlled by the game player may continue to move along the original moving direction, and prompt information C is displayed. For example, the prompt information C "be entering a pre-judged movement operation" is displayed, to prompt the game player that the pre-judged movement operation is entered already.

During a period of entering the pre judged movement operation, in a case that the game player operates the virtual joystick, or the time of the pre-judged movement operation exceeds a set time, the pre-judged movement ends, the game role stops moving, and the prompt information disappears.

Figure 7:
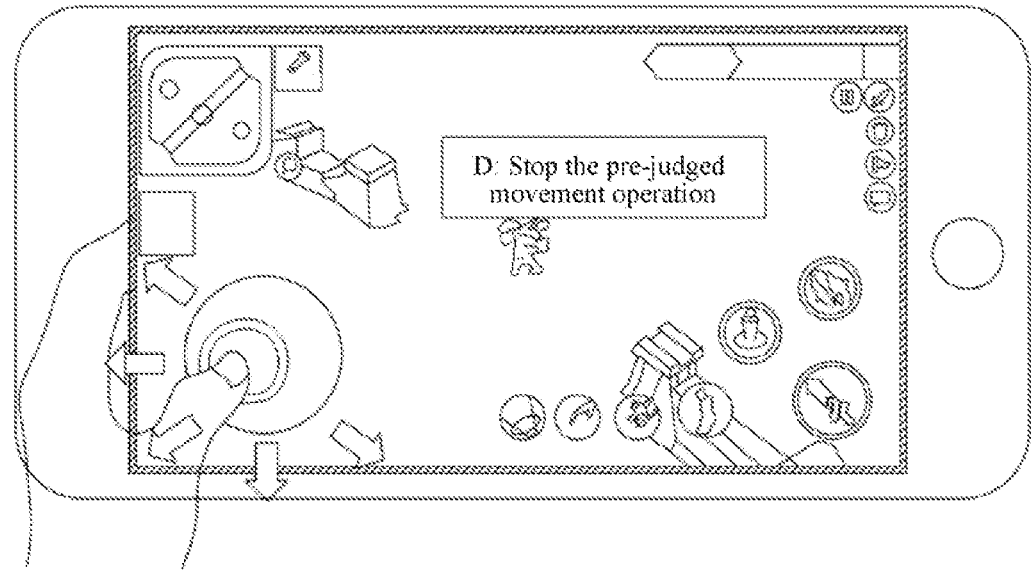
FIG. 7 is a schematic diagram of prompting that a pre-judged movement operation ends according to an embodiment of the present disclosure.

Optionally, during the period of entering the pre judged movement operation, in a case that the game player operates the virtual joystick, or the time of the pre-judged movement operation exceeds the set time, the prompt information may also be displayed. FIG. 7 is a schematic diagram of prompting that a pre judged movement operation ends according to an embodiment of the present disclosure. As shown in FIG. 7, the game player operates the virtual joystick, prompt information D "stop the pre judged movement operation" is displayed, to prompt that the pre-judged movement is ended, and the game role stops moving.

Figure 8:
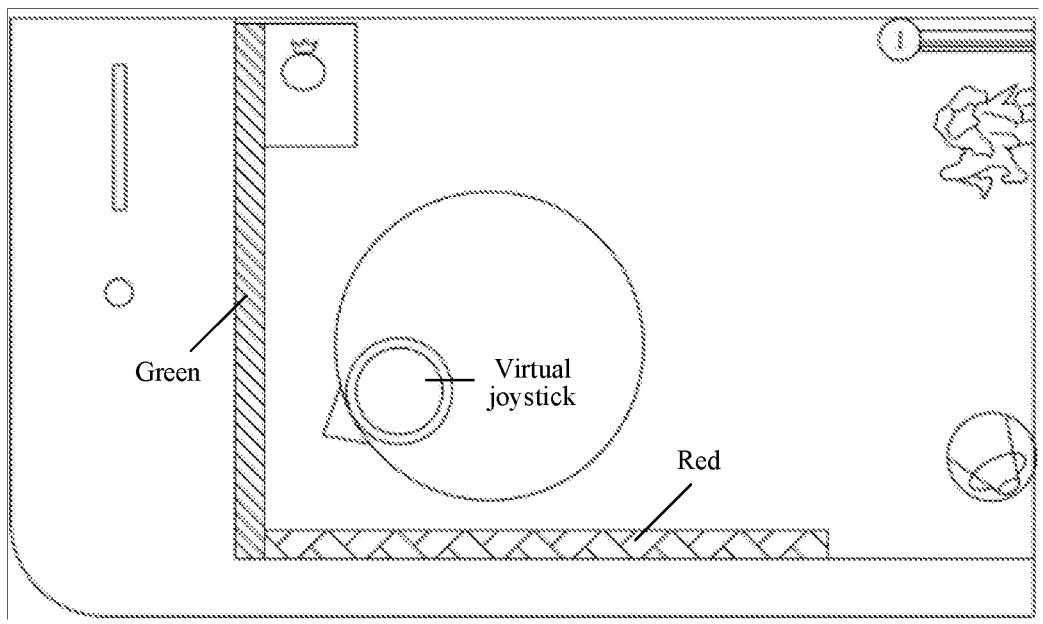
FIG. 8 is a schematic diagram of an interface for determining that an operation is lost according to an embodiment of the present disclosure.

FIG. 8 is a schematic diagram of an interface for determining that an operation is lost according to an embodiment of the present disclosure. As shown in FIG. 8, the green indication region and the red indication region are determining regions of one frame before the operation is lost. In a case that an operation is responded to in the two regions in a current frame, and the game role moves in one direction of the upper left direction, the left direction, the lower left direction, the lower direction, and the lower right direction, and a screen operation disappears in a next frame, it is determined that the operation is lost. The width and height of the green indication region and the width and height of the red indication region are all preset values.

In this embodiment, a next operation to be performed by the virtual controlled object may be pre judged and automatically performed according to the continuity of the operations of the game player by using a program algorithm in a case that the operation of the game player is lost, and the game player is informed that the operation is lost. As a result, the game player may take a corresponding measure in time, to reduce the loss in a case that the operation is lost, especially in a battle-type game requiring relatively high real-time performance. In this way, a case that the virtual controlled object does not perform any operation is avoided, so that a loss rate of the game player in one game is reduced. For the game player, poor game experience brought by the loss of the operations of the game player is reduced.

For the foregoing method embodiments, for a purpose of simple description, each method embodiment is described as a combination of a series of actions; however, a person skilled in the art is to know that, the present disclosure is not limited by the described action sequence, because according to the present disclosure, some steps can be performed in another sequence or synchronously. Secondly, the person skilled in the art is also to know that, all the embodiments described in the specification are exemplary embodiments, and the involved actions and modules are not necessarily required by the present disclosure.

According to the foregoing descriptions of implementations, the person skilled in the art may clearly know that the method according to the foregoing embodiments may be implemented by using software and a necessary general hardware platform, or certainly may be implemented by using hardware. However, in most cases, the former is a better implementation. Based on such an understanding, the technical solutions of the present disclosure or the part that makes contributions to the related art may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present disclosure.

Figure 9:
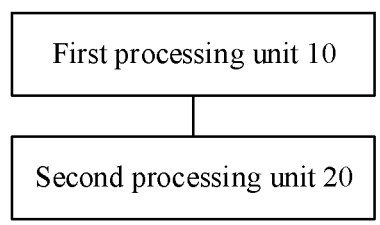
FIG. 9 is a schematic diagram of a control apparatus for a game application according to an embodiment of the present disclosure.

According to another aspect of the embodiments of the present disclosure, a control apparatus for a game application for performing the foregoing control method for a virtual controlled object is further provided. The apparatus includes one or more processors and one or more memories storing a program unit, the program unit being executed by the processor, and the program unit including a first processing unit and a second processing unit FIG. 9 is a schematic diagram of a control apparatus for a game application according to an embodiment of the present disclosure. As shown in FIG. 9, the apparatus may include: a first processing unit 10 and a second processing unit 20.

The first processing unit 10 is configured to enable a terminal to control, in a process that a client is running a game, in response to a first target operating instruction produced by a first touch operation, a virtual controlled object in the game to move toward a target direction, the terminal being provided with the client.

The second processing unit 20 is configured to enable the terminal to control, in a process of controlling the virtual controlled object to move toward the target direction, the virtual controlled object to continue to move toward the target direction in a case of detecting that the first touch operation is lost.

The first processing unit 10 and the second processing unit 20 may be run in the terminal as a part of the apparatus, and the functions implemented by the foregoing units may be performed by using a processor in the terminal. The terminal may be a terminal device such as a smartphone (such as an Android mobile phone or an iOS mobile phone), a tablet computer, a palmtop computer, a mobile Internet device (MID), or a PAD.

The first processing unit 10 in this embodiment may be configured to perform step S202 in the embodiments of this application; and the second processing unit 20 in this embodiment may be configured to perform step S204 in the embodiments of this application.

Optionally, the apparatus further includes a determining unit, configured to detect, in the process of controlling the virtual controlled object to move toward the target direction, whether the touch operation is lost according to at least one of the following operations: determining that the touch operation is lost in a case that the touch operation exceeds a touchscreen of the terminal, the terminal being provided with the client; and determining that the touch operation is lost in a case that the first touch operation reaches a preset region on the touchscreen of the terminal.

The determining unit may be run in the terminal as a part of the apparatus, or a function implemented by the foregoing unit may be executed by using the processor in the terminal.

Optionally, the preset region of the touchscreen includes an edge of the touchscreen.

Optionally, the second processing unit 20 includes a control module, configured to enable the terminal to control the virtual controlled object to continue to move toward the target direction within target duration.

The control module may be run, as a part of the apparatus, in the terminal. The functions implemented by the foregoing modules may be performed by using a processor in the terminal.

Optionally, the control module includes an obtaining sub-module, a first control sub-module, and a second control sub-module. The obtaining sub-module is configured to enable the terminal to obtain the duration in which the virtual controlled object continues to move toward the target direction; the first control sub-module is configured to enable the terminal to control the virtual controlled object to continue to move toward the target direction in a case that the duration does not exceed the target duration; and the second control sub-module is configured to enable the terminal to control the virtual controlled object to stop moving toward the target direction in a case that the duration exceeds the target duration.

The obtaining sub-module, the first control sub-module, and the second control sub-module may be run, as a part of the apparatus, in the terminal. The functions implemented by the foregoing sub-modules may be performed by using a processor in the terminal.

Optionally, the apparatus further includes a control unit, configured to enable, in the process that the terminal controls the virtual controlled object to continue to move toward the target direction within target duration, the terminal to control the virtual controlled object to stop moving toward the target direction in a case that the terminal obtains, within the target duration, a second target operating instruction produced by a second touch operation, the second target operating instruction being used for controlling a moving direction of the virtual controlled object.

The control unit may be run in the terminal as a part of the apparatus, or a function implemented by the foregoing unit may be executed by using the processor in the terminal.

Optionally, the apparatus further includes: a first receiving unit and a first response unit. The first receiving unit is configured to enable, before the terminal controls the virtual controlled object to continue to move toward the target direction with the target duration, the terminal to receive a first setting instruction; and the first response unit is configured to set the target duration in response to the first setting instruction.

The first receiving unit and the first response unit may be run in the terminal as a part of the apparatus, or functions implemented by the foregoing units may be executed by using the processor in the terminal.

Optionally, the apparatus further includes a first display unit, configured to enable, in a case of detecting that the touch operation is lost, the terminal to display first prompt information on a client, the first prompt information being used for prompting that the touch operation is lost.

The first display unit may be run in the terminal as a part of the apparatus, or a function implemented by the foregoing unit may be executed by using the processor in the terminal.

Optionally, the apparatus further includes a cancellation unit, configured to enable, after the terminal displays the first prompt information on the client, in a case that the virtual controlled object stops moving toward the target direction, the terminal to cancel the display of the first prompt information on the client.

The cancellation unit may be run in the terminal as a part of the apparatus, or a function implemented by the foregoing unit may be executed by using the processor in the terminal.

Optionally, the apparatus further includes a second display unit, configured to enable, in a case that the terminal cancels the display of the first prompt information on the client, the terminal to display second prompt information on the client, the second prompt information being used for prompting to cancel the display of the first prompt information.

The second display unit may be run in the terminal as a part of the apparatus, or a function implemented by the foregoing unit may be executed by using the processor in the terminal.

Optionally, the apparatus further includes: a second receiving unit and a second response unit. The second receiving unit is configured to enable, before the terminal detects that the touch operation is lost, the terminal to receive a second setting instruction; and the second response unit is configured to initiate, in response to the second setting instruction, a movement pre judgment function, the movement pre judgment function allowing the terminal to control the virtual controlled object to continue to move toward the target direction in a case that the terminal detects that the touch operation is lost.

The second receiving unit and the second response unit may be run in the terminal as a part of the apparatus, or functions implemented by the foregoing units may be executed by using the processor in the terminal.

Optionally, the first touch operation of this embodiment includes: a slide operation, and the target direction includes one of the following directions: an upper left direction, a left direction, a lower left direction, a lower direction, and a lower right direction.

In this embodiment, by using the first processing unit 10, in a process that a client is running a game, a terminal controls, in response to a first target operating instruction produced by a first touch operation, a virtual controlled object in the game to move toward a target direction; and by using the second processing unit 20, in a process of controlling the virtual controlled object to move toward the target direction, the terminal controls the virtual controlled object to continue to move toward the target direction in a case of detecting that the first touch operation is lost. In a process of controlling the virtual controlled object to move toward the target direction, the virtual controlled object is controlled to continue to move toward the target direction in a case that the touch operation is lost. That is, in a case that the touch operation is lost, a pre judgment is performed on an operation to be performed by the virtual controlled object, and the virtual controlled object is controlled to continue to move toward the same direction, to achieve an expectation of controlling the virtual controlled object, and prevent the control over the virtual controlled object from being stopped in a case that the touch operation is lost. In this way, a technical effect of improving the efficiency of controlling the virtual controlled object is implemented, to further resolve the technical problem of low efficiency of controlling the virtual controlled object in the related art.

Examples implemented by the foregoing units and modules and corresponding steps and application scenarios thereof are the same, but are not limited to the content disclosed in the foregoing embodiments. The foregoing units and modules may be run, as a part of the apparatus, in a hardware environment shown in FIG. 1, and may be implemented by using software, or may be implement by using hardware. The hardware environment includes a network environment.

According to another aspect of the embodiments of the present disclosure, an electronic apparatus for performing the foregoing control method for a virtual controlled object is further provided.

Figure 10:
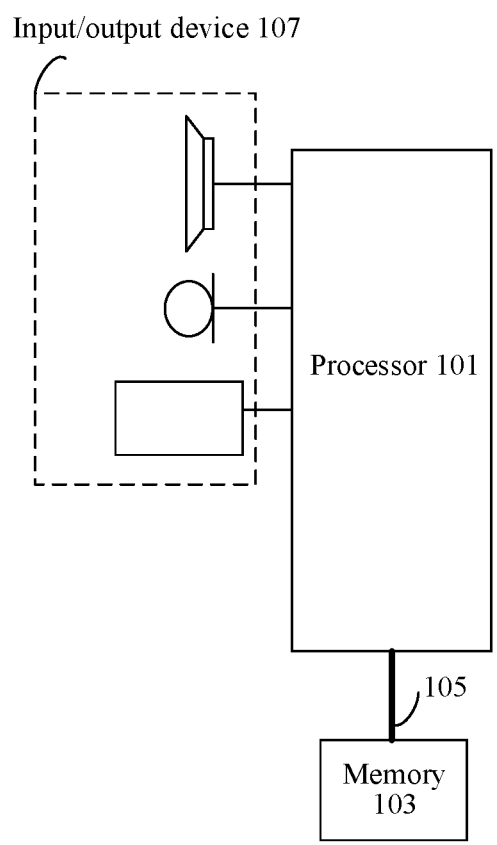
FIG. 10 is a structural block diagram of an electronic apparatus according to an embodiment of the present disclosure.

FIG. 10 is a structural block diagram of an electronic apparatus according to an embodiment of the present disclosure. As shown in FIG. 10, the electronic apparatus may include one or more processors 101 (where only one processor is shown in the figure) and a memory 103. The memory 103 may store a computer program. The processor 101 may be configured to run the computer program to perform the data processing method in the embodiments of the present disclosure.

The memory 103 may be configured to store computer programs and modules, for example, program instructions/modules corresponding to the control method and apparatus for a virtual controlled object in the embodiments of the present disclosure. The processor 101 is configured to run the software programs and modules stored in the memory 103, to perform various functional applications and data processing, to be specific, implement the foregoing control method for a virtual controlled object. The memory 103 may include a high-speed random access memory, and may also include a nonvolatile memory, for example, one or more magnetic storage devices, flash memories or other nonvolatile solid-state memories. In some examples, the memory 103 may further include memories remotely disposed relative to the processor 101, and these remote memories may be connected to the electronic apparatus through a network. Examples of the network include but are not limited to, the Internet, an intranet, a local area network, a mobile communications network, and a combination thereof.

Optionally, as shown in FIG. 10, the electronic apparatus may further include a transmission apparatus 105 and an input/output device 107. The transmission apparatus 105 is configured to receive or send data through a network, or may be used for data transmission between the processor and the memory. Specific examples of the foregoing network include a wired network and a wireless network. In an example, the transmission apparatus 105 includes a network interface controller (NIC) that may be connected to another network device and a router by using a network cable, thereby communicating with the Internet or a local area network. In an example, the transmission apparatus 105 is a radio frequency (RF) module that is configured to communicate with the Internet in a wireless manner.

Optionally, the memory 103 is configured to store application programs.

The processor 101 may be configured to invoke, by using the transmission apparatus 105, the computer program stored in the memory 103, to perform the following steps:

In a process that a client is running a game, a terminal controls, in response to a first target operating instruction produced by a first touch operation, a virtual controlled object in the game to move toward a target direction, the terminal being provided with the client.

In a process of controlling the virtual controlled object to move toward the target direction, the terminal controls the virtual controlled object to continue to move toward the target direction in a case of detecting that the first touch operation is lost.

The processor 101 is further configured to detect, in the process of controlling the virtual controlled object to move toward the target direction, whether the first touch operation is lost according to at least one of the following operations: determining, by the terminal, that the first touch operation is lost in a case that the first touch operation exceeds a touchscreen of the terminal, the terminal being provided with the client; and determining, by the terminal, that the first touch operation is lost in a case that the first touch operation reaches a preset region on the touchscreen of the terminal.

The processor 101 is further configured to perform the following step: controlling, by the terminal, the virtual controlled object to continue to move toward the target direction within target duration.

The processor 101 is further configured to perform the following steps: obtaining, by the terminal, duration in which the virtual controlled object continues to move toward the target direction; controlling, by the terminal, the virtual controlled object to continue to move toward the target direction in a case that the duration does not exceed the target duration; and controlling, by the terminal, the virtual controlled object to stop moving toward the target direction in a case that the duration exceeds the target duration.

The processor 101 is further configured to perform the following steps: in the process that the terminal controls the virtual controlled object to continue to move toward the target direction within target duration, controlling, by the terminal, the virtual controlled object to stop moving toward the target direction in a case that the terminal obtains, within the target duration, a second target operating instruction produced by a second touch operation, the second target operating instruction being used for controlling a moving direction of the virtual controlled object.

The processor 101 is further configured to perform the following steps: before the terminal controls the virtual controlled object to continue to move toward the target direction with the target duration, receiving, by the terminal, a first setting instruction; and in response to the first setting instruction, setting, by the terminal, the target duration.

The processor 101 is further configured to perform the following steps: in a case of detecting that the first touch operation is lost, displaying, by the terminal, first prompt information on a client, the first prompt information being used for prompting that the first touch operation is lost.

The processor 101 is further configured to perform the following step: after the terminal displays the first prompt information on the client, in a case that the virtual controlled object stops moving toward the target direction, canceling, by the terminal, the display of the first prompt information on the client.

The processor 101 is further configured to perform the following step: in a case that the terminal cancels the display of the first prompt information on the client, displaying, by the terminal, second prompt information on the client, the second prompt information being used for prompting to cancel the display of the first prompt information.

The processor 101 is further configured to perform the following steps: before the terminal detects that the first touch operation is lost, receiving, by the terminal, a second setting instruction; and in response to the second setting instruction, initiating, by the terminal, a movement pre judgment function, the movement pre judgment function allowing the terminal to control the virtual controlled object to continue to move toward the target direction in a case that the terminal detects that the first touch operation is lost.

A control solution for a game application is provided according to the embodiments of the present disclosure. In a process that a client is running a game, a terminal controls, in response to a first target operating instruction produced by a first touch operation, a virtual controlled object in the game to move toward a target direction, the terminal being provided with the client; and in a process of controlling the virtual controlled object to move toward the target direction, the terminal controls the virtual controlled object to continue to move toward the target direction in a case of detecting that the first touch operation is lost. In a process of controlling the virtual controlled object to move toward the target direction, the virtual controlled object is controlled to continue to move toward the target direction in a case that the touch operation is lost. That is, in a case that the touch operation is lost, a pre-judgment is performed on an operation to be performed by the virtual controlled object, and the virtual controlled object is controlled to continue to move toward the same direction, to achieve an expectation of controlling the virtual controlled object, and prevent the control over the virtual controlled object from being stopped in a case that the touch operation is lost. In this way, a technical effect of improving the efficiency of controlling the virtual controlled object is implemented, to further resolve the technical problem of low efficiency of controlling the virtual controlled object in the related art.

Optionally, for a specific example in this embodiment, refer to the examples described in the foregoing embodiments, and details are not described herein again in this embodiment.

A person of ordinary skill in the art may understand that, the structure shown in FIG. 10 is only illustrative. The electronic apparatus may be an electronic apparatus such as a smartphone (such as an Android mobile phone or an iOS mobile phone), a tablet computer, a palmtop computer, a mobile Internet device (MID), or a PAD. FIG. 10 does not constitute a limitation on a structure of the foregoing electronic apparatus. For example, the electronic apparatus may further include more or fewer components (such as a network interface and a display apparatus) than those shown in FIG. 10, or have a configuration different from that shown in FIG. 10.

A person of ordinary skill in the art may understand that all or some of the steps of the methods in the embodiments may be implemented by a program instructing electronic apparatus-relevant hardware. The program may be stored in a computer-readable storage medium. The storage medium may include a flash memory, a read-only memory (ROM), a random access memory (RAM), a magnetic disk, and an optical disc.

This embodiment of the present disclosure further provides a storage medium. Optionally, in this embodiment, the storage medium stores a computer program. The computer program, when run, is configured to perform the control method for a virtual controlled object.

Optionally, in this embodiment, the storage medium may be located in at least one of multiple network devices on a network shown in the foregoing embodiments.

Optionally, in this embodiment, the storage medium is configured to store the program code for performing the following steps:

In a process that a client is running a game, a terminal controls, in response to a first target operating instruction produced by a first touch operation, a virtual controlled object in the game to move toward a target direction, the terminal being provided with the client.

In a process of controlling the virtual controlled object to move toward the target direction, controlling the virtual controlled object to continue to move toward the target direction in a case of detecting that the first touch operation is lost.

Optionally, the storage medium is further configured to store program code for performing one of the following steps to detect whether the first touch operation is lost: determining, by the terminal, that the touch operation is lost in a case that the first touch operation exceeds a touchscreen of the terminal, the terminal being provided with the client; and determining, by the terminal, that the first touch operation is lost in a case that the first touch operation reaches a preset region on the touchscreen of the terminal.

Optionally, the storage medium is further configured to store program code for performing the following step: controlling, by the terminal, the virtual controlled object to continue to move toward the target direction within the target duration.

Optionally, the storage medium is further configured to store program code for performing the following steps: obtaining, by the terminal, duration in which the virtual controlled object continues to move toward the target direction; controlling, by the terminal, the virtual controlled object to continue to move toward the target direction in a case that the duration does not exceed the target duration; and controlling, by the terminal, the virtual controlled object to stop moving toward the target direction in a case that the duration exceeds the target duration.

Optionally, the storage medium is further configured to store program code for performing the following steps: in the process that the terminal controls the virtual controlled object to continue to move toward the target direction within target duration, controlling, by the terminal, the virtual controlled object to stop moving toward the target direction in a case that the terminal obtains, within the target duration, a second target operating instruction produced by a second touch operation, the second target operating instruction being used for controlling a moving direction of the virtual controlled object.

Optionally, the storage medium is further configured to store program code for performing the following steps: before the terminal controls the virtual controlled object to continue to move toward the target direction with the target duration, receiving, by the terminal, a first setting instruction; and in response to the first setting instruction, setting, by the terminal, the target duration.

Optionally, the storage medium is further configured to store program code for performing the following steps: in a case of detecting that the first touch operation is lost, displaying, by the terminal, first prompt information on a client, the first prompt information being used for prompting that the first touch operation is lost.

Optionally, the storage medium is further configured to store program code for performing the following step: after the terminal displays the first prompt information on the client, in a case that the virtual controlled object stops moving toward the target direction, canceling, by the terminal, the display of the first prompt information on the client.

Optionally, the storage medium is further configured to store program code for performing the following step: in a case that the terminal cancels the display of the first prompt information on the client, displaying, by the terminal, second prompt information on the client, the second prompt information being used for prompting to cancel the display of the first prompt information.

Optionally, the storage medium is further configured to store program code for performing the following steps: before the first touch operation is detected to be lost, receiving, by the terminal, a second setting instruction; and in response to the second setting instruction, initiating, by the terminal, a movement pre judgment function, the movement pre judgment function allowing the terminal to control the virtual controlled object to continue to move toward the target direction in a case that the terminal detects that the first touch operation is lost.

Optionally, for a specific example in this embodiment, refer to the examples described in the foregoing embodiments, and details are not described herein again in this embodiment.

Optionally, in this embodiment, the storage medium may include, but is not limited to, any medium that can store program code, such as a USB flash drive, a ROM, a RAM, a removable hard disk, a magnetic disk, or an optical disc.

The control method for a virtual controlled object, the apparatus, the storage medium, and the electronic apparatus according to the embodiments of the present disclosure are described above by using examples with reference to the accompanying drawings. However, a person skilled in the art is to understand that, various improvements may be further made for the control method for a virtual controlled object, the apparatus, the storage medium, and the electronic apparatus proposed in the embodiments of the present disclosure without departing from content of the present disclosure. Therefore, the protection scope of the embodiments of the present disclosure is to be subject to the content of the appended claims.

The sequence numbers of the embodiments of the present disclosure are merely for the convenience of description, and do not imply the preference among the embodiments.

When the integrated unit in the foregoing embodiment is implemented in the form of a software functional unit and sold or used as an independent product, the integrated unit may be stored in the foregoing computer-readable storage medium. Based on such an understanding, the technical solutions of the present disclosure essentially, or the part contributing to the related art, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the descriptions of the embodiments have respective focuses. For the part that is not detailed in an embodiment, refer to the relevant description of other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one second processing unit, or each of the units may exist alone physically, or two or more units may be integrated into one unit. The integrated unit may be implemented in the form of hardware, or may be implemented in the form of a software function unit.

The foregoing descriptions are merely exemplary implementations of the present disclosure. A person of ordinary skill in the art may make several improvements or polishing without departing from the principle of the present disclosure, and the improvements or polishing shall fall within the protection scope of the present disclosure.

INDUSTRIAL APPLICABILITY

In the embodiments of the present disclosure, in a process that a client is running a game, a terminal controls, in response to a first target operating instruction produced by a first touch operation, a virtual controlled object in the game to move toward a target direction, the terminal being provided with the client; and in a process of controlling the virtual controlled object to move toward the target direction, the terminal controls the virtual controlled object to continue to move toward the target direction in a case of detecting that the first touch operation is lost. In a process of controlling the virtual controlled object to move toward the target direction, the virtual controlled object is controlled to continue to move toward the target direction in a case that the touch operation is lost. That is, in a case that the touch operation is lost, a pre judgment is performed on an operation to be performed by the virtual controlled object, and the virtual controlled object is controlled to continue to move toward the same direction, to achieve an expectation of controlling the virtual controlled object, and prevent the control over the virtual controlled object from being stopped in a case that the touch operation is lost. In this way, a technical effect of improving the efficiency of controlling the virtual controlled object is implemented, to further resolve the technical problem of low efficiency of controlling the virtual controlled object in the related art.

What is claimed is:

1. A method for controlling a virtual controlled object, comprising:
    detecting, by a terminal, a first target operating instruction produced by a first touch operation while a client is running a game on the terminal;
    in response to the first target operating instruction, controlling, by the terminal, a virtual controlled object in the game to move toward a target direction;
    while controlling the virtual controlled object to move toward the target direction, controlling, by the terminal, the virtual controlled object to continue movement toward the target direction after detecting that the first touch operation is lost; and
    in accordance with a determination by the terminal that the first touch operation is lost, displaying, by the terminal, first prompt information on the client, the first prompt information being used for prompting that the first touch operation is lost.

2. The method according to claim 1, further comprising:
    while controlling the virtual controlled object to move toward the target direction, detecting whether the first touch operation is lost according to at least one of the following operations:
    determining, by the terminal, that the first touch operation is lost when the first touch operation leaves a touchscreen of the terminal; and
    determining, by the terminal, that the first touch operation is lost when the first touch operation reaches a preset region of the touchscreen of the terminal.

3. The method according to claim 2, wherein the preset region of the touchscreen comprises an edge of the touchscreen.

4. The method according to claim 1, wherein the controlling, by the terminal, the virtual controlled object to continue movement toward the target direction comprises:
    controlling, by the terminal, the virtual controlled object to continue movement toward the target direction within target duration.

5. The method according to claim 4, wherein the controlling, by the terminal, the virtual controlled object to continue movement toward the target direction within target duration comprises:
    obtaining, by the terminal, duration in which the terminal continues movement toward the target direction;
    controlling, by the terminal, the virtual controlled object to continue movement toward the target direction when the duration does not exceed the target duration; and
    controlling, by the terminal, the virtual controlled object to stop moving toward the target direction when the duration exceeds the target duration.

6. The method according to claim 4, further comprising:
    while controlling the virtual controlled object to continue movement toward the target direction within target duration: when the terminal obtains, within the target duration, a second target operating instruction produced by a second touch operation, controlling, by the terminal, the virtual controlled object to stop moving toward the target direction, the second target operating instruction being used for controlling a moving direction of the virtual controlled object.

7. The method according to claim 4, further comprising:
    before controlling the virtual controlled object to continue movement toward the target direction within the target duration:
    receiving, by the terminal, a first setting instruction; and in response to the first setting instruction, setting, by the terminal, the target duration.

8. The method according to claim 1, further comprising: after displaying the first prompt information on the client, in accordance with a determination by the terminal that the virtual controlled object stops moving toward the target direction, canceling, by the terminal, the display of the first prompt information on the client.

9. The method according to claim 8, further comprising: when the terminal cancels the display of the first prompt information on the client, displaying, by the terminal, second prompt information on the client, the second prompt information being used for prompting to cancel the display of the first prompt information.

10. The method according to claim 1, further comprising: before the terminal detects that the first touch operation is lost:
receiving, by the terminal, a second setting instruction; and
in response to the second setting instruction, initiating, by the terminal, a movement pre judgment function, the movement pre judgment function allowing the terminal to control the virtual controlled object to continue to move toward the target direction in a case that the terminal detects that the first touch operation is lost.

11. The method according to claim 1, wherein the first touch operation comprises: a slide operation, and the target direction comprises one of the following directions: an upper left direction, a left direction, a lower left direction, a lower direction, and a lower right direction.

12. A terminal for controlling a virtual controlled object, comprising:
one or more processors; and
memory storing a plurality of program units, wherein the plurality of program units, when executed by the one or more processors, cause the one or more processors to perform a plurality of operations comprising:
detecting, by the terminal, a first target operating instruction produced by a first touch operation while a client is running a game on the terminal;
in response to the first target operating instruction, controlling, by the terminal, a virtual controlled object in the game to move toward a target direction;
while controlling the virtual controlled object to move toward the target direction, controlling, by the terminal, the virtual controlled object to continue movement toward the target direction after detecting that the first touch operation is lost; and
in accordance with a determination by the terminal that the first touch operation is lost, displaying, by the terminal, first prompt information on the client, the first prompt information being used for prompting that the first touch operation is lost.

13. The terminal according to claim 12, wherein the plurality of operations further comprise:
while controlling the virtual controlled object to move toward the target direction, detecting whether the first touch operation is lost according to at least one of the following operations:
determining, by the terminal, that the first touch operation is lost when the first touch operation leaves a touchscreen of the terminal; and
determining, by the terminal, that the first touch operation is lost when the first touch operation reaches a preset region of the touchscreen of the terminal.

14. The terminal according to claim 12, wherein the controlling, by the terminal, the virtual controlled object to continue movement toward the target direction comprises:
controlling, by the terminal, the virtual controlled object to continue movement toward the target direction within target duration.

15. A non-transitory computer readable storage medium storing a plurality of computer programs that, when executed by a terminal having one or more processors, cause the terminal to perform a plurality of operations comprising:
detecting, by the terminal, a first target operating instruction produced by a first touch operation while a client is running a game on the terminal;
in response to the first target operating instruction, controlling, by the terminal, a virtual controlled object in the game to move toward a target direction;
while controlling the virtual controlled object to move toward the target direction, controlling, by the terminal, the virtual controlled object to continue movement toward the target direction after detecting that the first touch operation is lost; and
in accordance with a determination by the terminal that the first touch operation is lost, displaying, by the terminal, first prompt information on the client, the first prompt information being used for prompting that the first touch operation is lost.

16. The non-transitory computer readable storage medium according to claim 15, wherein the plurality of operations further comprise:
while controlling the virtual controlled object to move toward the target direction, detecting whether the first touch operation is lost according to at least one of the following operations:
determining, by the terminal, that the first touch operation is lost when the first touch operation leaves a touchscreen of the terminal; and
determining, by the terminal, that the first touch operation is lost when the first touch operation reaches a preset region of the touchscreen of the terminal.

17. The non-transitory computer readable storage medium according to claim 15, wherein the controlling, by the terminal, the virtual controlled object to continue movement toward the target direction comprises:
controlling, by the terminal, the virtual controlled object to continue movement toward the target direction within target duration.

* * * * *